United States Patent [19]

Moresi, Jr.

[11] 4,267,566
[45] May 12, 1981

[54] SEALED FLAT ELECTROLYTIC CAPACITOR AND METHOD

[75] Inventor: Joseph A. Moresi, Jr., Oak Ridge, Tenn.

[73] Assignee: Sprague Electric Company, North Adams, Mass.

[21] Appl. No.: 26,469

[22] Filed: Apr. 2, 1979

[51] Int. Cl.$^3$ .......................... H01G 9/00; B01J 17/00
[52] U.S. Cl. .................................... 361/433; 361/271; 29/570
[58] Field of Search .................. 361/271, 433; 29/570

[56] References Cited

U.S. PATENT DOCUMENTS

| | | | |
|---|---|---|---|
| 1,395,931 | 11/1921 | Smith | 361/271 |
| 2,085,958 | 7/1937 | Curtis | 361/433 |
| 3,345,543 | 10/1967 | Sato | 361/433 |
| 3,365,626 | 1/1968 | Mohler | 361/433 |
| 3,375,413 | 3/1968 | Brill | 361/433 |
| 3,766,443 | 10/1973 | Asakawa et al. | 361/433 |
| 3,819,340 | 6/1974 | Heier et al. | 29/570 |
| 4,097,985 | 7/1978 | Morimoto et al. | 29/570 |

Primary Examiner—Andrew J. James
Attorney, Agent, or Firm—Connolly and Hutz

[57] ABSTRACT

A flat capacitor is manufactured by placing an anode foil within a fold of spacer within a folded cathode foil, impregnating with electrolyte, and heat-sealing between layers of heat-sealable polymer. The foils have electrode tabs attached thereto that are spaced laterally from each other and extend beyond the same edges of the polymer. Leads are attached to the tabs external to the sealed polymer edges.

3 Claims, 2 Drawing Figures

U.S. Patent  May 12, 1981  4,267,566
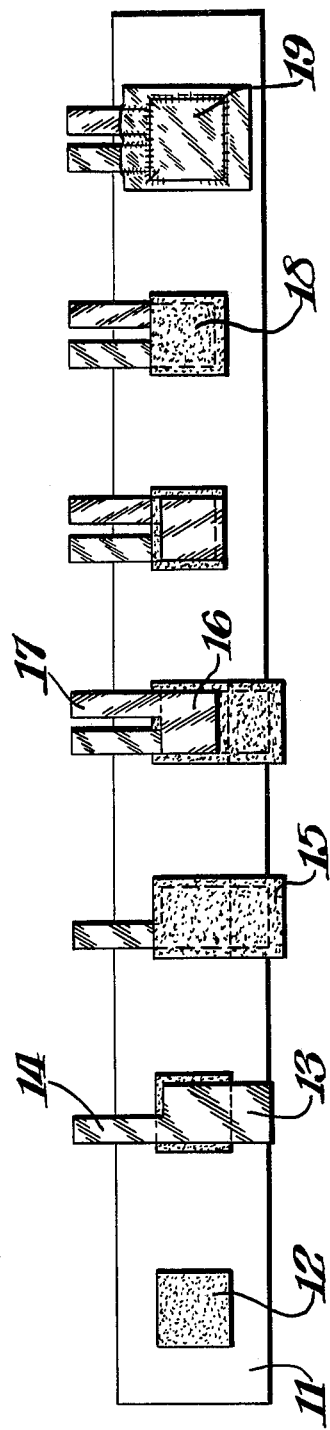
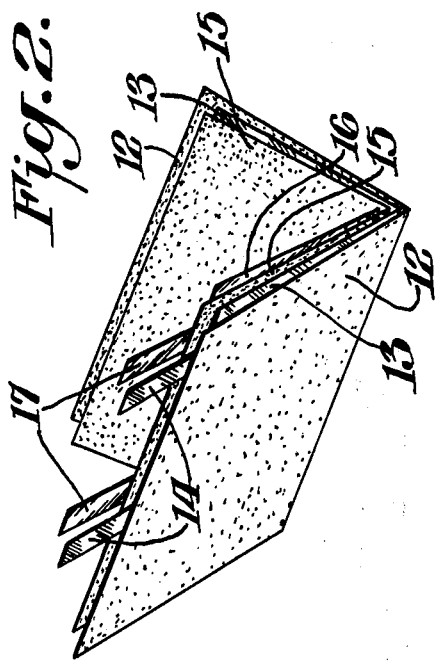

SEALED FLAT ELECTROLYTIC CAPACITOR AND METHOD

BACKGROUND OF THE INVENTION

This invention relates to a flat electrolytic capacitor and to the manufacture thereof. More particularly it relates to a method which can be automated and produces a relatively low-cost capacitor product.

There is an increasing demand for electrolytic capacitors with a low CV (Capacitance X Voltage) value. This demand has been met by a variety of capacitors: subminiature wound aluminum electrolytics, solid electrolytics, and some plastic film, paper, and ceramic capacitors.

Each type embodies advantages in terms of cost, size, form factor, electrical characteristics, etc. No one, however, offers all or a majority of the advantages or required characteristics.

SUMMARY OF THE INVENTION

One of the purposes of this invention is to provide a method for making an electrolytic capacitor in such a size and form as to give maximum component packaging density when used with circuit boards.

Another feature is the provision of automatic assembly of such units, thus reducing costs.

The capacitors may be assembled on a continuous plastic strip that becomes one side of the final package or the units may be assembled continuously and placed on the strip just before final sealing. In either case, the result is a flat electrolytic capacitor encased in a heat-sealable plastic with leads spaced to correspond to that required for automatic insertion into circuit boards.

BRIEF DESCRIPTION OF THE DRAWING

FIG. 1 is a series of drawings showing one of the methods of making the capacitors of the present invention.

FIG. 2 shows another embodiment of the invention.

DESCRIPTION OF THE PREFERRED EMBODIMENTS

Onto a plastic film strip 11 having a laminar, heat-sensitive adhesive layer is placed a sheet of spacer paper 12. Over that is placed etched cathode foil 13 with attached electrode tab 14. On top of this, a second sheet of spacer paper 15 is placed followed by etched, anodized anode foil 16 with attached electrode tab 17. In the embodiment shown, the anode foil 16 is approximately one-half the length of cathode foil 13 and spacer 15 and excess cathode foil 13 and spacer 15 are folded over anode foil 16. A third paper spacer 18 is placed over the assembly, and electrolyte (not shown) is applied to the foil and spacer package. A plastic film cover sheet 19 is placed over all, and the assembly is heat-sealed at least around the periphery thereof. Cathode and anode leads (not shown) are attached by known means to cathode electrode tab 14 and anode electrode tab 17.

As paper spacer 12 is unwound from a roll (not shown) it is folded in half lengthwise. Etched cathode foil 13 with attached electrode tabs 14 is likewise unwound from a roll (not shown), folded in half lengthwise and positioned inside folded paper spacer 12. Another paper spacer 15 is unwound from its supply roll, folded in half lengthwise and positioned inside folded cathode foil 13. Anode foil 16 with attached electrode tabs 17 is positioned inside folded paper spacer 15. Subsequently, the assembly is flatted and cut into individual capacitors before or after impregnation with electrolyte. The individual units may be placed on the plastic strip which may be folded over to form an envelope or a second cover strip may be used. The units are then heat sealed as above, and leads are attached.

One method of assembling the flat electrolytic capacitor suited for automatic insertion into printed circuit boards uses a plastic film strip which forms part of the final package as the base on which the capacitor is assembled. A piece of spacer paper is attached by heat-sensitive adhesive to the strip. Over this, etched cathode foil with attached electrode tab is tacked down, then a second spacer paper, etched and anodized anode foil with attached electrode tab, and another piece of spacer paper. Electrolyte is applied to the resulting assembly, wetting the papers. Finally a plastic film cover is placed over all, and the unit is heat sealed. The electrode tabs protrude beyond the package, preferably along the same edge, and leads are attached to them by known means. The strip may bear dots of the heat-sensitive adhesive to tack down each layer to hold it in place as it is added, or a drop of adhesive may be placed on the strip at each station.

The assembly scheme lends itself to automation by using a continuous plastic film strip that is moved along the line from station to station for super-position of each succeeding layer at each succeeding station.

In another embodiment, the anode foil is approximately one-half the length of the cathode foil and second spacer. Before adding the third spacer, excess cathode foil and second spacer is folded over the anode foil. The process is completed as before.

Similarly, the first paper may be the length of the cathode foil and second spacer, and all may be folded over the anode, doing away with the third spacer paper. Also, the plastic strip may be twice the final width and it may be folded over the unit instead of using a second plastic strip prior to heat-sealing, thus eliminating the second strip and a seam on one side of the unit. Another permutation is to space the units farther apart, cut them apart after impregnation, fold the plastic over from the side, and heat-seal.

Another way of automatically assembling the units is to preassemble the capacitors and then deposit them on adhesive-coated portions of the plastic strip and finally heat-sealing the units in plastic. This may be achieved using paper spacer wider than the cathode foil, a continuous strip of etched cathode foil with electrode tabs attached and a continuous strip of etched and anodized anode foil with electrode tabs attached. As paper spacer is unwound from its roll, it is automatically folded in half lengthwise forming a V. Cathode foil with attached tabs is unwound from its roll, folded into a V, and inserted or dropped into the V-shaped folded spacer strip. Another paper spacer is unwound and folded into a V and inserted or dropped between the sides of the cathode foil V. The anode foil with attached electrode tabs is then dropped or inserted into the inner paper V. The V's are mechanically closed and paper crimped or cold-welded vertically between adjacent sets of anode-cathode tabs. The strip bearing pods of capacitors are impregnated with electrolyte, and the pods are cut apart forming individual units which are then placed on the plastic strip, covered with another layer of plastic as above and heat-sealed. Alternately, the continuous anode foil strip might be inserted into folded paper spacer strip, in turn inserted into folded cathode foil strip that in turn is inserted into an outer folded paper strip and crimped, impregnated, separated into individual units, and heat-sealed in plastic as above. If more rigidity is desired, plastic grids, e.g. 10–20 mils thick, may be placed on the plastic strip, and the pods placed in them. Other permutations will be obvious to those skilled in the art.

The plastic strip is of thermoplastic material; suitable commercially available thermoplastics include polyolefins, e.g., polyethylene or polypropylene, perfluoroethylene, polyvinylchloride, or polyester.

While not restricted to the following sizes, the above methods are suitable for making capacitors of 0.5 to 1.5 inches by 0.75 to 1.5 inches by 0.1 inch. Lead wire spacing on the smallest of the above is 0.2 inch with increments of 0.1 inch for the larger sizes.

A light weight capacitor is thus produced that takes up a minimum of board area and provides maximum component packaging density per board and for automatic insertion with conventional equipment.

What is claimed is:

1. A flat electrolytic capacitor comprising an etched and anodized foil anode bearing an electrode tab, an etched foil cathode bearing an electrode tab, said anode foil being of substantially the same width and approximately one-half the length of said cathode foil, said anode foil being within a fold of a first spacer, said cathode foil being folded once to overlie both sides of said anode and said first spacer and to cover both sides of said anode, said folded cathode being within a fold of a second spacer, said first and said second spacers being impregnated with an electrolyte, thereby providing said electrolyte in contact with both sides of said anode and both sides of said cathode, said tabs being laterally spaced from each other and extending beyond the edges of said spacers; said foils, said spacers, and a portion of said tabs being heat-sealed between layers of polymer.

2. A capacitor according to claim 1 wherein, said electrode tabs extend beyond said polymer layers, lead attachment to said tabs being external to the edges of said polymer layers and said heat-seal.

3. A capacitor according to claim 1 wherein said spacer is a paper spacer.

* * * * *